United States Patent
Lu et al.

(10) Patent No.: US 8,544,280 B2
(45) Date of Patent: Oct. 1, 2013

(54) CONTINUOUS DETONATION WAVE ENGINE WITH QUENCHING STRUCTURE

(75) Inventors: Frank K. Lu, Arlington, TX (US); Nathan L. Dunn, Arlington, TX (US)

(73) Assignee: Board of Regents, The University of Texas System, Austin, TX (US)

(*) Notice: Subject to any disclaimer, the term of this patent is extended or adjusted under 35 U.S.C. 154(b) by 1046 days.

(21) Appl. No.: 12/545,309

(22) Filed: Aug. 21, 2009

(65) Prior Publication Data

US 2010/0050592 A1   Mar. 4, 2010

Related U.S. Application Data

(60) Provisional application No. 61/091,846, filed on Aug. 26, 2008.

(51) Int. Cl.
*F02K 7/02* (2006.01)
*F02C 5/00* (2006.01)

(52) U.S. Cl.
USPC ............ 60/772; 60/247; 60/39.76; 431/1

(58) Field of Classification Search
USPC ........... 60/39.35, 39.38, 39.63, 39.76, 247, 60/772, 776; 431/1
See application file for complete search history.

(56) References Cited

U.S. PATENT DOCUMENTS

| | | | | |
|---|---|---|---|---|
| 5,513,489 A | * | 5/1996 | Bussing | .................. 60/39.38 |
| 2005/0144959 A1 | | 7/2005 | Lu et al. | |
| 2005/0284127 A1 | * | 12/2005 | Tobita et al. | .................. 60/39.34 |
| 2007/0144179 A1 | * | 6/2007 | Pinard et al. | .................. 60/776 |
| 2009/0102203 A1 | | 4/2009 | Lu et al. | |
| 2009/0126343 A1 | | 5/2009 | Lu et al. | |

FOREIGN PATENT DOCUMENTS

JP   2006009764   1/2006

OTHER PUBLICATIONS

"Pulse detonation engine" article at http://en.wikipedia.org/wiki/Pulse_detonation_engine, saved on Jul. 11, 2009 (4 pp.).
DARPA "Vulcan" Broad Agency Announcement (BAA) 08-53, dated Jul. 30, 2008 (38 pp.).
DARPA "Vulcan Industry Day Agenda," dated Jun. 10, 2008 (50 pp).
F. A. Bykovskii et al, "Continuous Spin Detonation of Hydrogen—Oxygen Mixtures," Combustion, Explosion, and Shock Waves, vol. 44, No. 2, 2008, (pp. 150-162).
F. Falempin et al.. "Toward a Continuous Detonation Wave Rocket Engine Demonstrator," 14th AIAA/AHI Space Planes and Hypersonic Systems and Technologies Conference, AIAA 2006-7956, 2006 (11 pp.).
J. Li et al., "Experimental study on transmission of an overdriven detonation wave from propane/oxygen to propane/air," Combustion and Flame 154 (2008), May 2, 2008 (pp. 331-345).

(Continued)

*Primary Examiner* — Phutthiwat Wongwian
*Assistant Examiner* — Scott Walthour
(74) *Attorney, Agent, or Firm* — Chowdhury & Georgakis, P.C.

(57) ABSTRACT

A continuous detonation wave engine (CDWE) is disclosed. An example embodiment includes a generally annular combustion chamber dimensioned to allow a fuel mixture to detonate, a mixing chamber, and a fuel mixture channel that provides for fluid communication between the mixing chamber and the combustion chamber. At least part of the fuel mixture channel features a quenching structure dimensioned to substantially prevent detonation from spreading from the combustion chamber via the fuel mixture channel to the mixing chamber. Other embodiments are described and claimed.

15 Claims, 12 Drawing Sheets

(56) References Cited

OTHER PUBLICATIONS

"Diesel Engine" article at http://en.wikipedia.org/wiki/Diesel_engine, saved on Jul. 12, 2009, (pp. 1-26).
"Explosive Material" article at http://en.wikipedia.org/wiki/Explosives, saved on Jul. 6, 2009, (pp. 1-15).
Fedor A. Bykovskii et al., "Continuous Spin Detonations," Journal of Propulsion and Power, vol. 22, No. 6, Nov.-Dec. 2006, (pp. 150-162).
Eric M. Braun et al., "Testing of a Continuous Detonation Wave Engine with Swirled Injection," American Institute of Aeronautics and Astronautics, 48th AIAA Aerospace Sciences Meeting Including the New Horizons Forum and Aerospace Exposition, Jan. 4-7 2010, (pp. 1-12), Orlando, Florida.
Manabu Hishida et al., "Fundamentals of Rotating Detonations," Shock Waves (2009), vol. 19, (pp. 1-10).
Gabriel Canteins, "Study of the Rotating Continuous Detonations—Applications to Propulsion," doctoral thesis, Doctoral School for Science & Aerospace Engineering, Ecole Nationale Supérieure de Mécanique et d'Aérotechnique, Faculty of Fundamental and Applied Sciences, Nov. 9, 2006, (pp. 1-198) (an English translation of the Abstract is also included).
Piotr Wolanski, "Cooperation of the Institute of Heat Engineering with Japanese Universities and Research Institutes 1990-2007," Warsaw University of Technology, Institute of Heat Engineering, estimated publication date Jun. 2008, Nowowiejska 25, 00-665 Warsaw, Poland (filename: 20070629_Cooperation—of_the_Institute_of_Heat_Engineering_with_Japanese_Universities_ and_Research_Institutes.ppt).

* cited by examiner

CONTINUOUS DETONATION WAVE ENGINE WITH QUENCHING STRUCTURE

CROSS REFERENCE TO RELATED APPLICATIONS

This application claims the benefit of the filing date of U.S. provisional patent application No. 61/091,846, incorporated herein by reference, which was filed on Aug. 26, 2008, by the same inventors of this application.

STATEMENT REGARDING FEDERALLY SPONSORED RESEARCH OR DEVELOPMENT

This invention was made with government support under Grant Number HRD 02-17691 awarded by the National Science Foundation. The government has certain rights in the invention.

FIELD OF THE INVENTION

The present invention relates generally to the field of engines, and more specifically to engines powered by detonation, and associated devices.

SUMMARY

Conventional heat engines typically derive power primarily from a type of combustion known as deflagration. However, in recent years, researchers have attempted to design engines that derive power primarily from detonation, rather than deflagration. Such engines are known as detonation engines.

This disclosure describes one or more embodiments of a type of detonation engine known as a continuous detonation wave engine (CDWE). A CDWE may also be referred to as a "rotational detonation wave engine" or "RDWE." Associated devices and methods are also disclosed.

BRIEF DESCRIPTION OF THE DRAWINGS

Features and advantages of the present invention will become apparent from the appended claims, the following detailed description of one or more example embodiments, and the corresponding figures.

DETAILED DESCRIPTION OF ONE OR MORE EMBODIMENTS

Like parts may be marked throughout the specification and drawing with the same reference numerals. In addition, it should be understood that the embodiments of the present invention are not limited to the precise arrangements and configurations shown. Although the design and use of various embodiments are discussed in detail below, it should be appreciated that the present invention provides many inventive concepts that may be embodied in a wide variety of contexts. The specific aspects and embodiments discussed herein are merely illustrative of ways to make and use the invention. It would be impossible or impractical to include all of the possible embodiments and contexts of the invention in this disclosure. Upon reading this disclosure, many alternative embodiments of the present invention will be apparent to persons of ordinary skill in the art.

According to the wikipedia entry for "pulse detonation engine" at en.wikipedia.org/wiki/Pulse_detonation_engine, all conventional jet engines and most rocket engines operate on the deflagration of fuel, that is, the rapid but subsonic combustion of fuel. Other types of internal combustion engines also operate on the deflagration of fuel. For purposes of this disclosure, engines that operate on the deflagration of fuel are referred to as conventional engines.

Detonation engines, by contrast, operate on the supersonic detonation of fuel. In other words, for a detonation engine, the oxygen and fuel combustion process is supersonic, effectively an explosion instead of burning. Although conventional engines may occasionally experience detonation, conventional engines are not designed to operate with detonations, and may suffer structural failure as a result of detonations. Similarly, detonation engines may also experience deflagration. However, unlike conventional engines, detonation engines are designed to harness a significant portion of the energy released by detonation.

Pulse detonation engines (PDEs) and CDWEs are two different types of detonation engines. As recognized at page 19 of the "VULCAN_Industry_Day_Presentations.pdf" file at www.darpa.mil/TTO/solicit/BAA08-53, PDEs derive energy from a series of consecutive detonations. Each individual detonation cycle may be considered as one pulse.

By contrast, as the name suggests, CDWEs derive energy from a continuous wave of detonation. For example, published U.S. patent application no. 2005/0284127 entitled "Detonation Engine and Flying Object Provided Therewith" by Akihiro Tobita et al. (the "Tobita application") describes a "detonation engine which creates thrust by generating a detonation wave." In particular, the Tobita application describes an engine having "a rotational flow generation device which generates rotational flow about an axis in a mixed gas of air and fuel or a mixed gas of oxygen and fuel; a detonation chamber which is arranged on the downstream side of the rotational flow generation device, formed in a ring-shape radially extended and continuous in the circumferential direction, which continuously combusts the mixed gas in which the rotational flow is generated by the rotational flow generation device, in the circumferential direction to generate detonation waves, and draws it in from the radial inside and exhausts it to the radial outside; and a nozzle which is connected to the detonation chamber, and jets the high temperature and pressure combustion gas generated by the detonation waves flowing from the detonation chamber, to the rear while expanding it, and converts it into thrust."

However, at this point in time, descriptions of detonation engines are typically based largely on theory and conjecture. Detonation engines have not yet progressed beyond the experimental stage. CDWEs, in particular, have only recently progressed from the design phase to the testing phase, to the best of the applicants' knowledge.

The present disclosure describes one or more example embodiments of a CDWE designed for testing purpose. Alternative embodiments for practical or commercial use will contain many different features. Nevertheless, certain features of the embodiments described herein, or different but equivalent counterparts of those features, are expected to be used in commercial applications. At least one of the features described herein is expected to provide significant advantages over previously proposed detonation engine designs.

Figure 1:
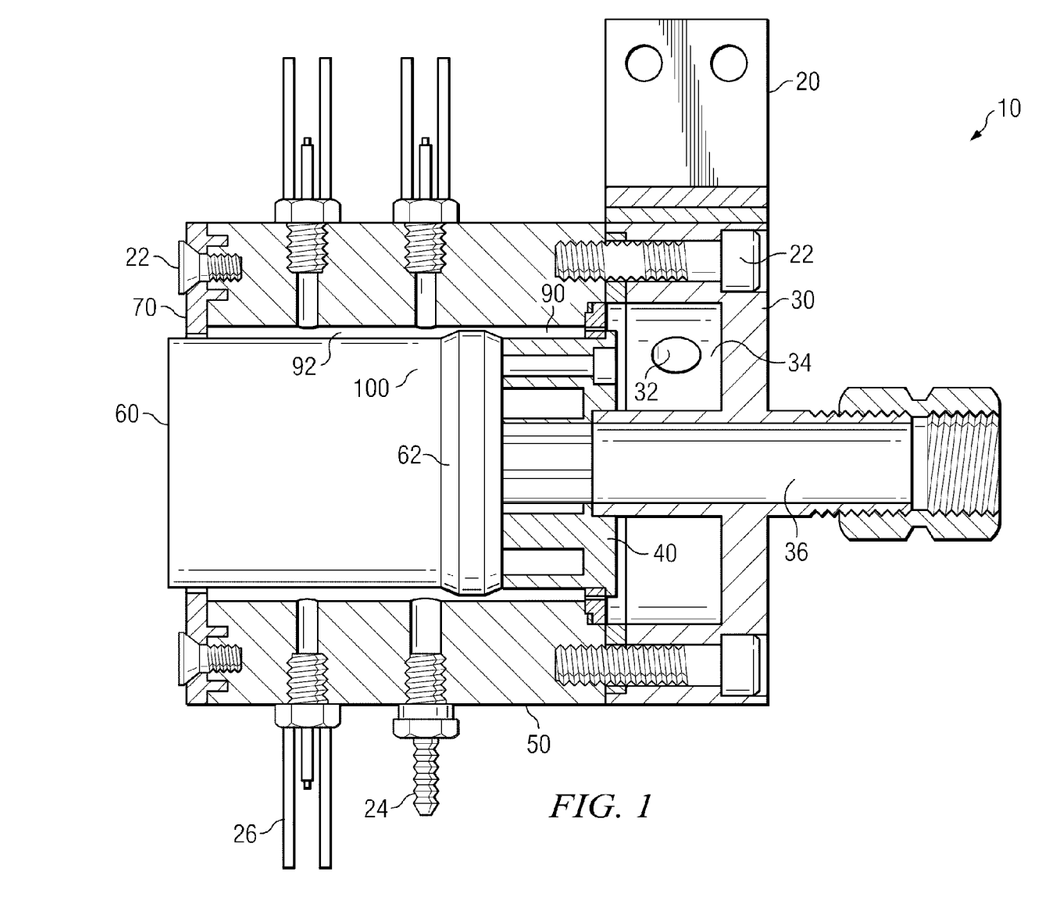
FIG. 1 is a schematic side view of an example CDWE with parts cut away.
Figure 2:
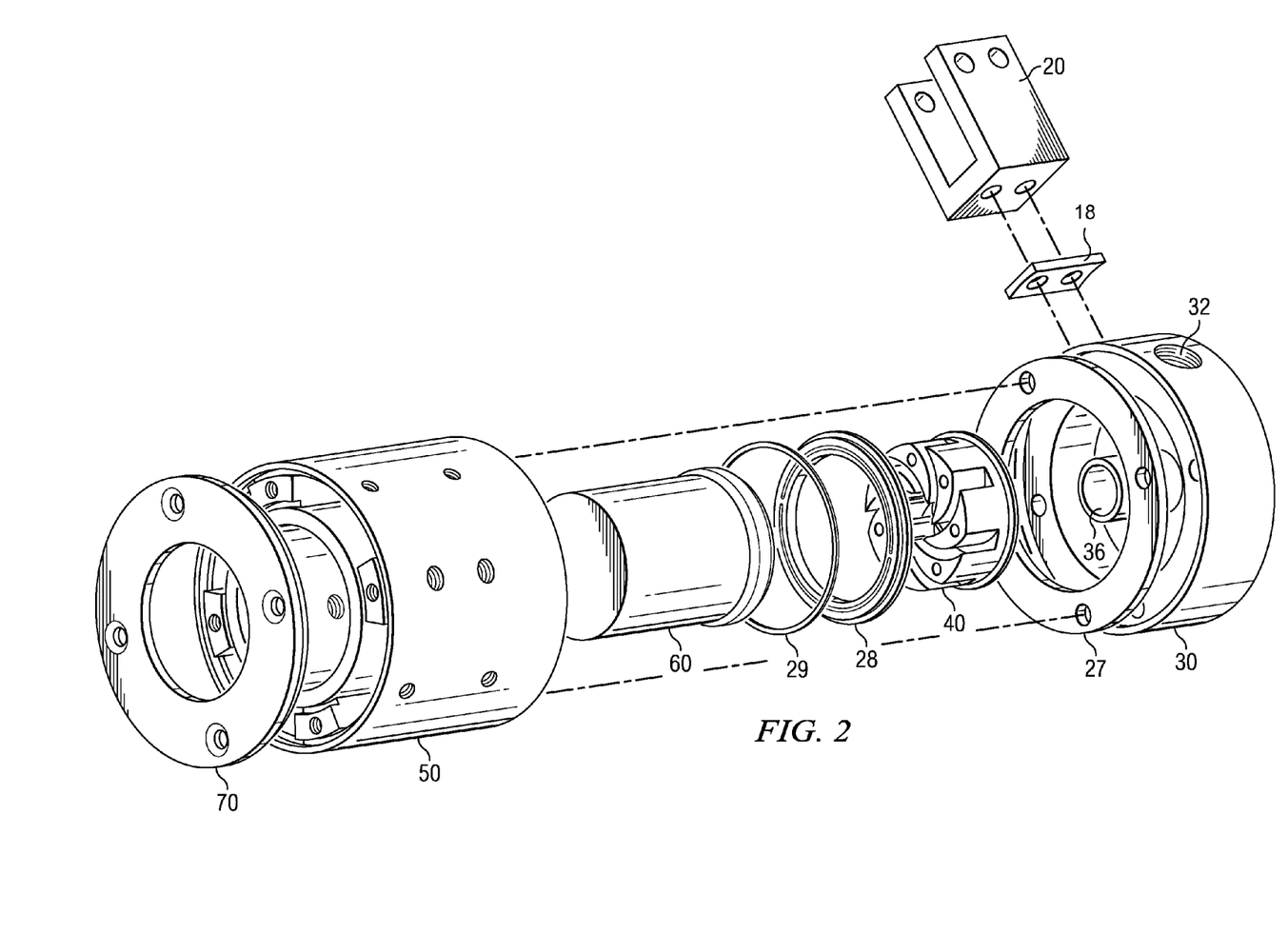
FIG. 2 is an exploded view of the CDWE of FIG. 1.

FIG. 1 is a schematic side view of an example CDWE 10 according to the present invention with parts cut away. For instance, parts of the jacket and fuel plenum are not shown, to enable more of the centerpiece to be seen. FIG. 2 is an exploded view of CDWE 10. As shown in FIGS. 1 and 2, CDWE 10 includes a fuel plenum 30, and air diffuser 40, a jacket 50, and a centerpiece 60. As described in greater detail below, the space between air diffuser 40 and jacket 50 serves as a mixing chamber 90, and the space between centerpiece 60 and jacket 50 servers as a combustion chamber 92. Similarly, an annular chamber in fuel plenum 30 serves as a fuel chamber 34. In one embodiment, jacket 50 includes inner and outer cylindrical walls, with space between those walls to allow for liquid cooling. Other types of jackets may be used in other embodiments.

As illustrated, CDWE 10 also includes an isolator 62 positioned between mixing chamber 90 and combustion chamber 92. As described in greater detail below, isolator 62 serves to prevent detonation from spreading from combustion chamber 92 into mixing chamber 90. Isolator 62 may also be referred to as an isolator ring or a restriction ring. In other embodiments, other types of isolators or restrictors can be used to prevent detonation from spreading from the combustion chamber to the mixing chamber.

CDWE 10 may include various other structures, such as a backplate 70, a mounting bracket 20, a mounting plate 18, various fasteners 22 and pressure sensors or transducers 26, and one or more igniters 24.

In operation, fuel is delivered into fuel plenum 30 via a fuel port 32. The fuel then travels from fuel chamber 34 into mixing chamber 90 via a fuel injection ring 28. In the example embodiment of FIG. 2, fuel injection ring 28 features one or more channels that allow fuel to pass from fuel chamber 34 into mixing chamber 90. For instance, fuel injection ring 28 may feature two channels, with one channel running through about 170 degrees of half of the ring, and the other running through about 170 degrees of the other half of the ring, almost splitting the ring into an inner ring and an outer ring, but for about 10 degrees on two opposite points on the ring, where material remains to keep the inner and outer portions attached.

In addition, air is delivered into air diffuser 40 via an oxidizer port 36, and the vanes of air diffuser 40 direct that air into mixing chamber 90, while imparting an angular momentum to the air. In some embodiments, a fan or other compressor may be used to force air into oxidizer port 36. The swirling air from air diffuser 40 mixes with the fuel in mixing chamber 90 to create an air/fuel mixture. As described in greater detail below, this air/fuel mixture than passes isolator 62 to enter combustion chamber 92, where the mixture is detonated to release energy. This disclosure refers to the area involving isolator 62 as the quench zone 100.

In one embodiment, CDWE 10 uses igniter 24 to start the detonation process, but then the detonation process continues substantially without interruption, as one or more waves of detonation continuously propagate around the combustion chamber, consuming the air/fuel mixture, while fresh mixture is continually introduced into the combustion chamber, to allow the detonation wave or waves to cycle around the combustion chamber again and again.

For the sake of brevity, this disclosure typically refers to air as the oxidizer. However, other types of oxidizers (e.g., oxygen or other fluids containing oxygen) may be used in other embodiments. Accordingly, references herein to "air" should generally be understood to include other oxidizers (e.g., substantially pure $O_2$), as well. Accordingly, the teachings herein may be used for air breathing engines, as well as other types of engines, such as rockets, for instance.

As shown in FIG. 2, various adapters or gaskets may be used between the various components. For instance, a fuel plenum gasket 27 may be used between fuel plenum 30 and jacket 50, and an adapter 29 may be used between fuel injection ring 28 and jacket 50.

Figure 3:
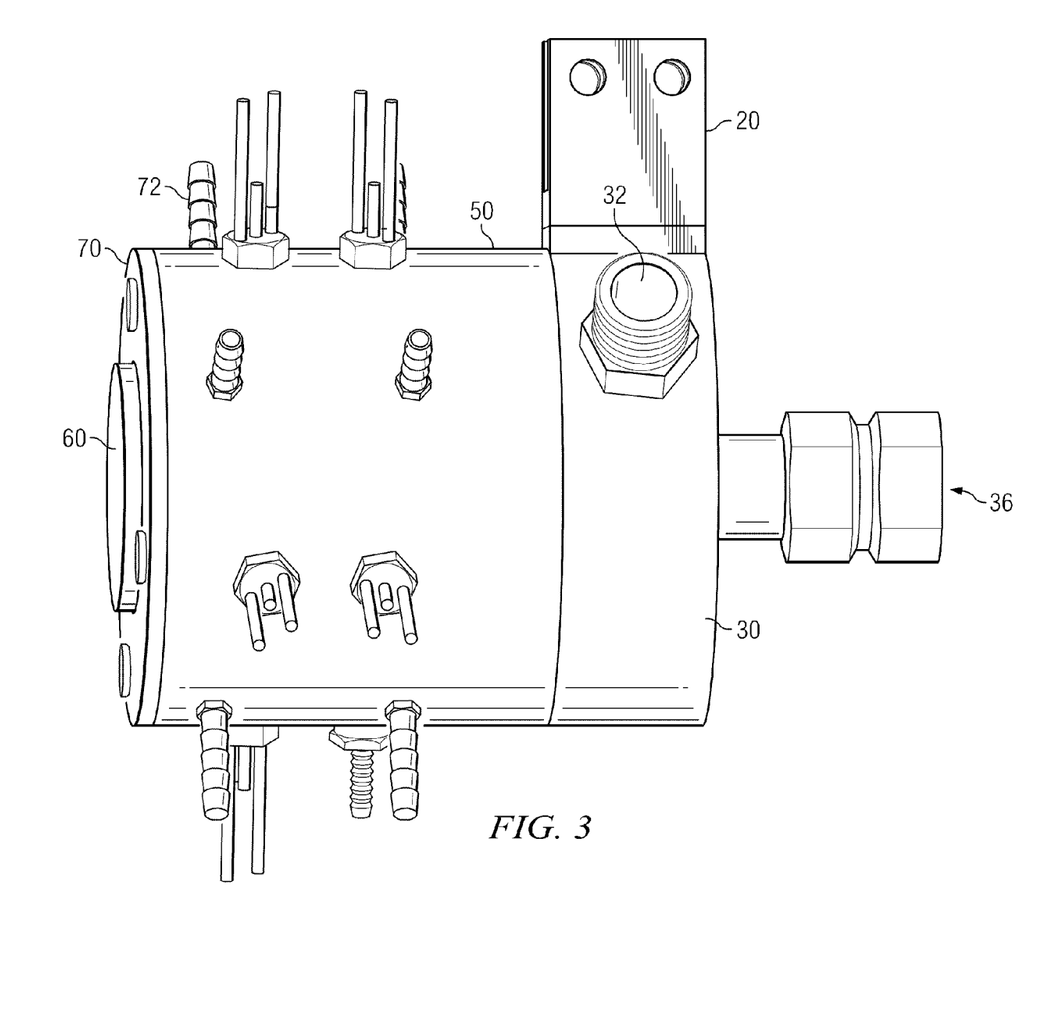
FIG. 3 is a side view of the CDWE of FIG. 1.

As shown in FIG. 3, CDWE 10 may also include one or more cooling ports 72 for directing any suitable cooling fluid (e.g., a water-based cooling solution, fuel such as liquid hydrogen, etc.) through jacket 50.

Figure 4:
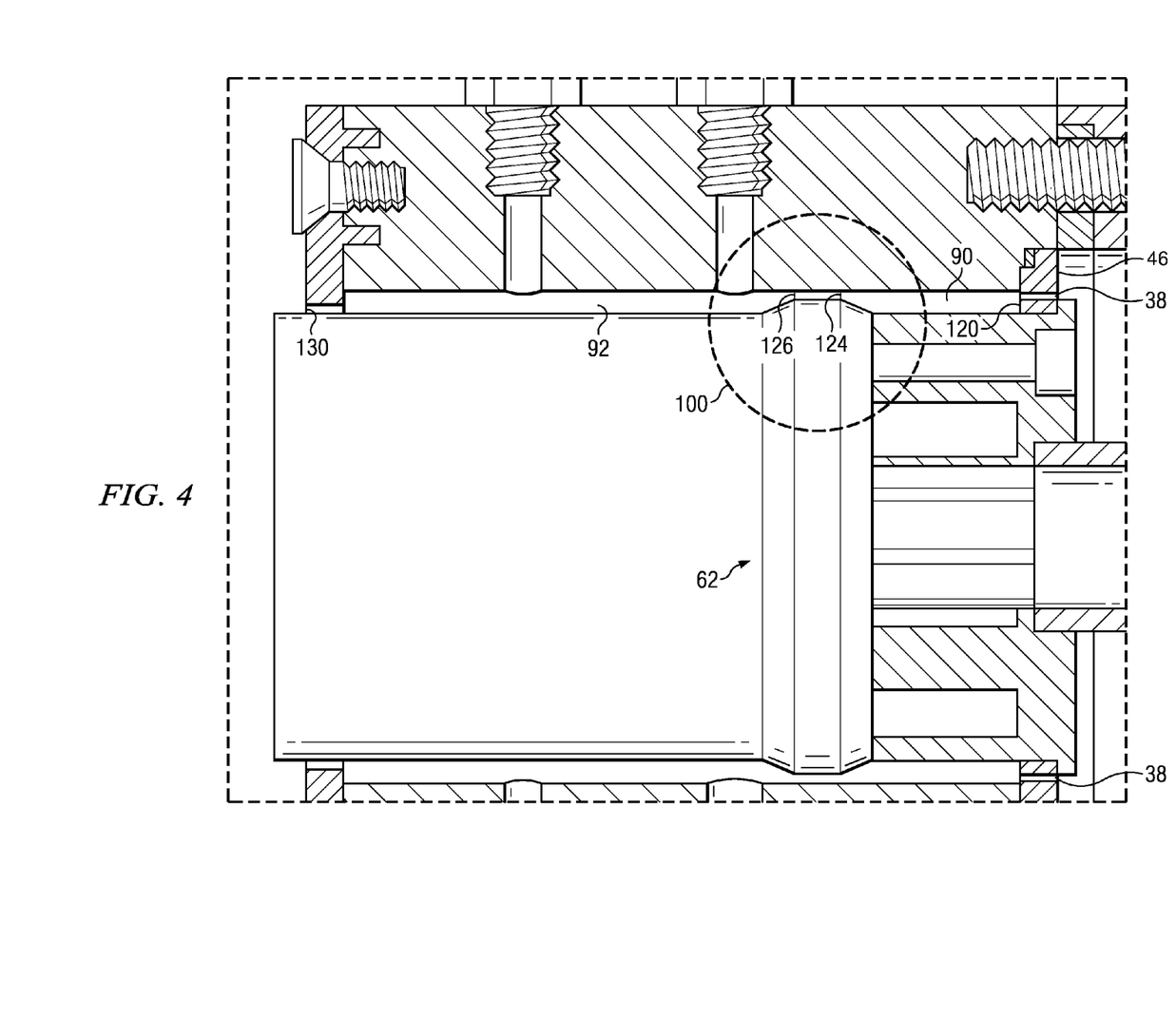
FIG. 4 is a closer side view of the CDWE of FIG. 1 with parts cut away.

FIG. 4 is a side view of CDWE 10, focusing more closely on quench zone 100. In addition, FIG. 4 provides a more detailed view of the fuel injection channels 38 in fuel injection ring 46. As indicated above, fuel travels into mixing chamber 90 from fuel chamber 34 via fuel injection channels 38, and air travels into mixing chamber 90 from air diffuser 40.

For ease of reference, different positions within CDWE 10 may be referred to as distinct stages. In particular, stage 1 denotes the beginning of mixing chamber 90, as depicted at position 120 in FIG. 4, while stage 3 denotes the end of mixing chamber 90, as depicted at position 124. (Stages 2 and 5 are described in greater detail below with regard to FIG. 5.) The outer perimeter of air diffuser 40 and the inner perimeter of jacket 50 also serve as boundaries for mixing chamber 90. Stage 4 denotes the beginning of combustion chamber 92, as depicted at position 126, and stage 6 denotes the end of combustion chamber 92, as depicted at position 130.

Figure 5:
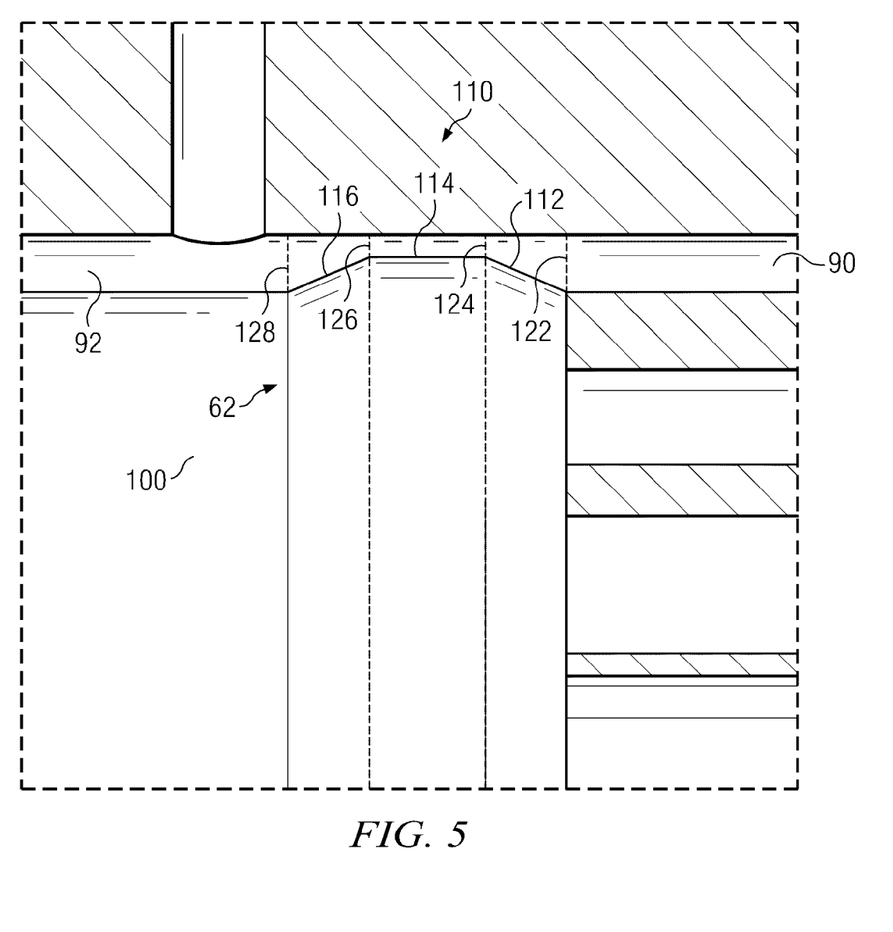
FIG. 5 is an even closer side view of the CDWE of FIG. 1 with parts cut away.

FIG. 5 is a side view of CDWE 10, focusing even more closely on quench zone 100. Fuel mixture region 110 extends from position 122 to 128. For example, as shown at position 124, stage 3 denotes the beginning of the maximum quench zone 114, and as shown at position 126, stage 4 denotes the end of the maximum quench zone 114. The area between stages 2 and 3 (122 & 124) serves as an intermediate zone 112 in the mixing chamber for the air/fuel mixture to flow through on the way to combustion chamber 92. Similarly, the area between stages 5 and 4 (128 & 126) serves as an intermediate zone 116 in combustion chamber 92 to begin eliminating detonation while allowing fresh mixture to enter combustion chamber 92.

In one embodiment, isolator 62 is formed as part of centerpiece 60. In other embodiments, the isolator may be made separately and then attached to centerpiece 60 via any suitable means, such as by welding, press fit, with fasteners, etc. Alternatively, the isolator may be part of, or attached to, other components in the CDWE, such as the inner wall of the jacket. Alternatively, an isolator may include structures on both the centerpiece and the inner wall of the jacket which cooperate to prevent detonation from traveling from the combustion chamber into the mixing chamber.

Figure 6:
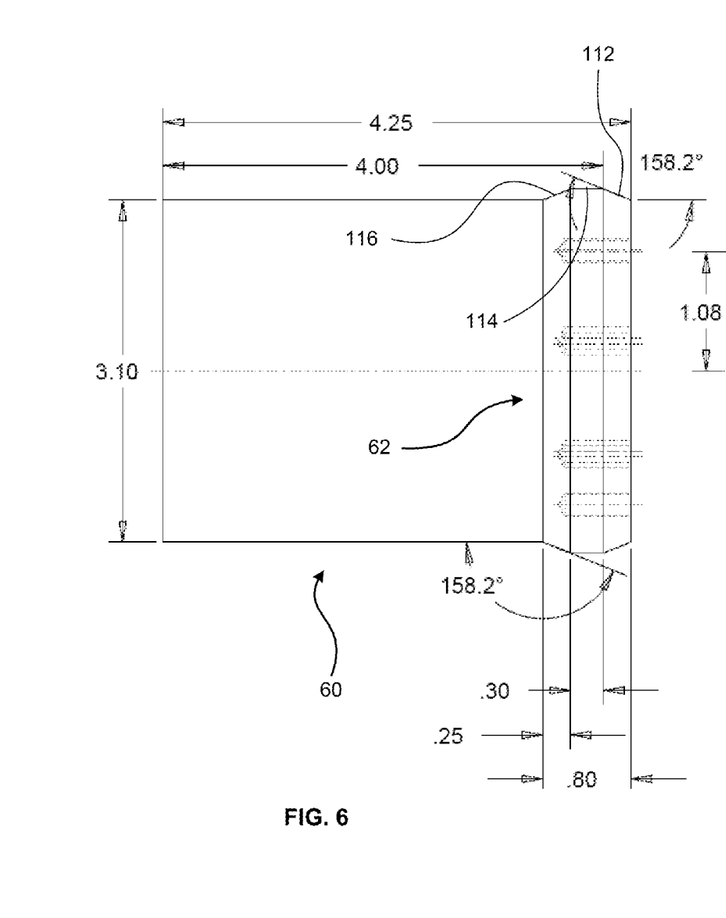
FIG. 6 is a schematic diagram of a side view of the centerpiece of the CDWE of FIG. 1.
Figure 7:
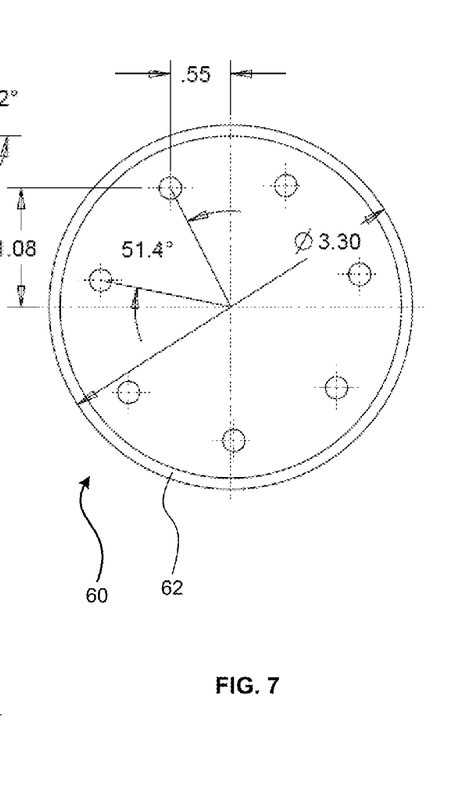
FIG. 7 is a schematic diagram of a front view of the centerpiece of FIG. 6.

FIG. 6 is a schematic diagram of a side view of centerpiece 60, and FIG. 7 is a schematic diagram of a front view of centerpiece 60.

The specific dimensions illustrated in the drawings pertain to one or more specific example embodiments. For instance, FIGS. 6-16 and 18-20 pertain to an embodiment fueled by hydrogen and oxygen, mixed at a selected ratio. Accordingly, combustion chamber 92 has a height from centerpiece 60 to jacket 50 in excess of the detonation cell size for that particular fuel mixture. By contrast, the shortest height from isolator 62 to jacket 50 in quench zone 100 is smaller than the detonation cell size for that fuel mixture.

Figure 10:
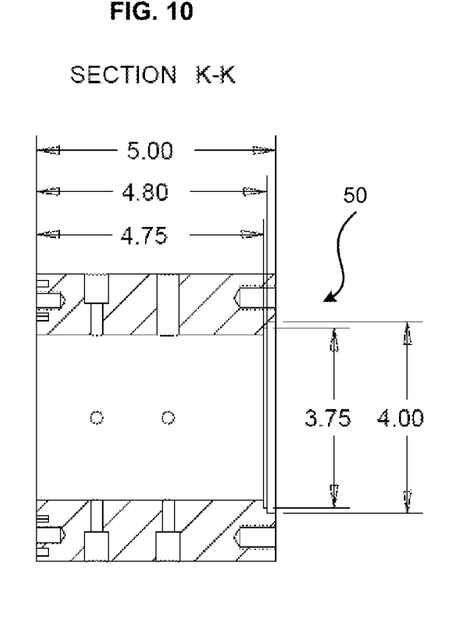
FIG. 10 is a schematic diagram of a cross section of the jacket of FIG. 9, along line K.

In particular, as shown in FIG. 10, the inner diameter of jacket 50 is 3.45 inches. As shown in FIG. 6, the outer diameter of centerpiece 60 in the area of the combustion chamber is 3.10 inches. And as shown in FIG. 7, the outer diameter of isolation ring 62 is 3.30 inches. Thus, with centerpiece 60 centered in jacket 50, the height of the combustion chamber is 0.18 inches ((3.45−3.10)/2), and the minimum height of the quench zone is 0.08 inches ((3.45−3.30)/2). At 25.4 mm per inch, those heights are 4.45 mm and 1.91 mm, respectively.

Different CDWEs, however, may use different dimensions, to provide for different operating characteristics with the same fuel mixture, or to allow other fuel mixtures, including mixtures containing hydrocarbons or other types of fuels, to be used.

The following chart lists some possible fuels, oxidizers, and fuel/oxidizer mixture ratios, along with a general range of suggested heights for combustion chambers and isolators for use with those fuel mixtures. The values in the chart below are based on the fuel/oxidizer ratio being stoichiometric.

| Fuel | Oxidizer | Cell Size, mm | Comb. Ch., mm | Isolator, mm |
| --- | --- | --- | --- | --- |
| Hydrogen | Oxygen | 1.3 | ~4 | ~0.5 |
| Methane | Oxygen | 4.5 | ~10 | ~3 |
| Ethylene | Oxygen | 0.8 | ~3 | ~0.5 |
| Propane | Oxygen | 2.5 | ~8 | ~1.5 |
| Hexane | Oxygen | 1.7 | ~5 | ~1 |
| JP-10 | Oxygen | 2 | ~8 | ~1 |
| Hydrogen | Air | 10.9 | ~30 | ~7 |
| Acetylene | Air | 9 | ~12 | ~5 |
| Ethylene | Air | 22.8 | ~30 | ~15 |
| Propane | Air | 51.3 | ~70 | ~30 |
| Benzene | Air | 126 | ~175 | ~80 |

-continued

| Fuel | Oxidizer | Cell Size, mm | Comb. Ch., mm | Isolator, mm |
| --- | --- | --- | --- | --- |
| Hexane | Air | 51.1 | ~75 | ~30 |
| Octane | Air | 42 | ~60 | ~25 |
| JP-10 | Air | 60.4 | ~100 | ~45 |
| JP-10 | Air | 47 | ~75 | ~30 |
| JP-10 | Air | 54.7 | ~75 | ~30 |
| Decane | Air | 42 | ~75 | ~30 |
| Jet-A | Air | 45 | ~75 | ~30 |
| JP-4 | Air | 45 | ~75 | ~30 |

For purposes of this disclosure, the term "height," when applied to a generally annular channel, refers to the distance from the inner wall to the outer wall. For a cylindrical channel (i.e., with no obstruction in the center) height is the same as the diameter. For an elliptical channel, or other non-cylindrical channel, the height is the distance between two points on opposite sides of the channel.

Thus, CDWE 10 has a generally annular combustion chamber which is dimensioned to allow a fuel mixture (i.e., a mixture of fuel and oxidizer) to detonate. CDWE 10 also has a fuel mixture channel which provides for fluid communication between the mixing chamber and the combustion chamber. In the embodiment of FIG. 5, the fuel mixture channel is the area that starts at stage 2 (position 122) and ends at stage 5 (position 128). In addition, at least part of the fuel mixture channel includes a quenching structure—isolator 62—dimensioned to substantially prevent detonation from spreading from the combustion chamber via fuel mixture channel to the mixing chamber.

In addition, as indicated above, alternative embodiments may use different dimensions and components to meet requirements for different implementations. For example, at least part of centerpiece 60 may have a taper, and backplate 70 may be replaced with a nozzle. Also, while CDWE 10 features cylindrical or annular mixing and combustion chambers, in other embodiments one or both of those chambers may use another shape, such as an oval; an ellipse; or another generally curved, closed shape; for example. For purposes of this disclosure, the term "generally annular" refers to any generally rounded shape that is shaped more or less like a ring or a sleeve, including circular rings and sleeves, oval rings and sleeved, elliptical rings and sleeves, and other generally curved rings and sleeves, as well as sleeves without a uniform shape along their length.

Figure 8:
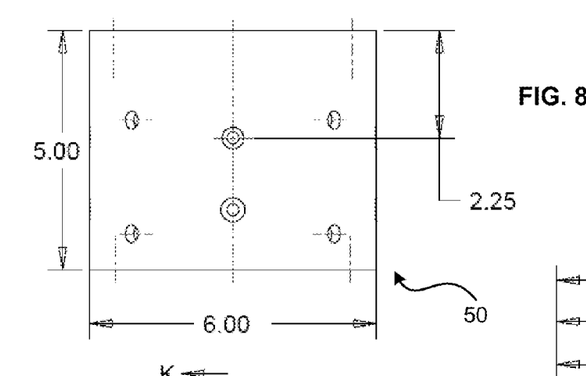
FIG. 8 is a schematic diagram of a side view of the jacket of the CDWE of FIG. 1.
Figure 9:
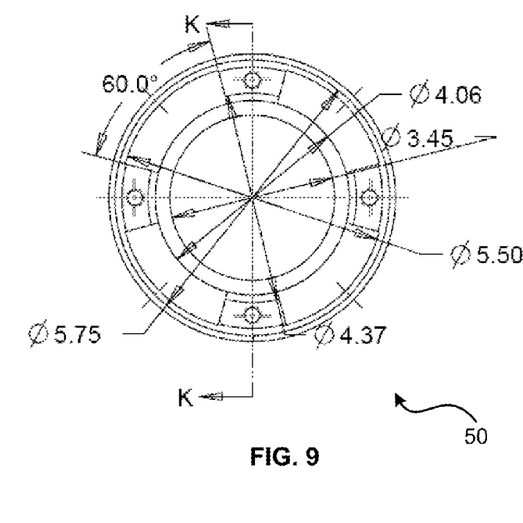
FIG. 9 is a schematic diagram of a rear view of the jacket of FIG. 8.
Figure 11:
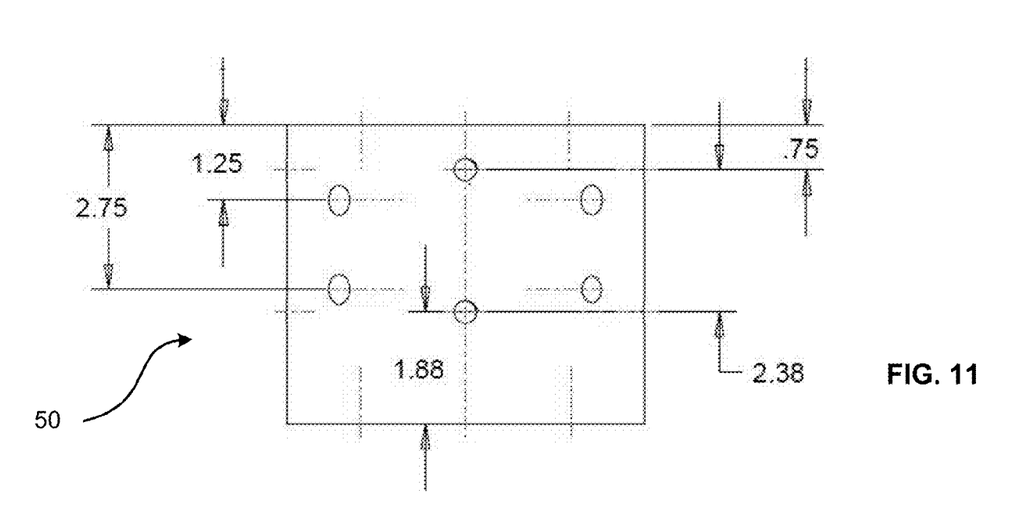
FIG. 11 is a schematic diagram of another side view of the jacket of FIG. 8.
Figure 12:
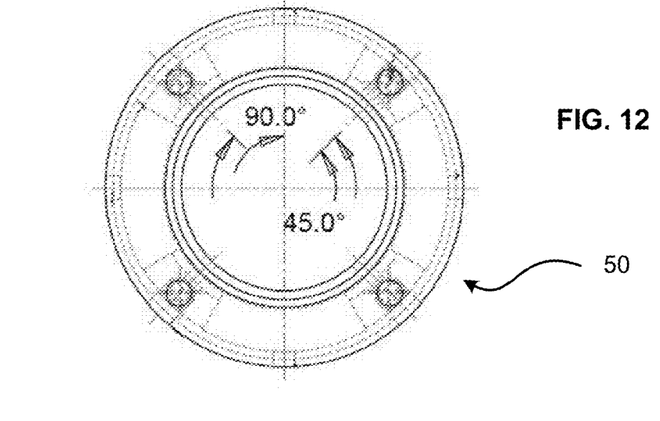
FIG. 12 is a schematic diagram of a front view of the jacket of FIG. 8.

FIG. 8 is a schematic diagram of a side view of jacket 50. FIG. 9 is a schematic diagram of a rear view of jacket 50. FIG. 10 is a schematic diagram of a cross section of the jacket of FIG. 9, along line K. FIG. 11 is a schematic diagram of another side view of jacket 50. FIG. 12 is a schematic diagram of a front view of jacket 50.

Figure 13:
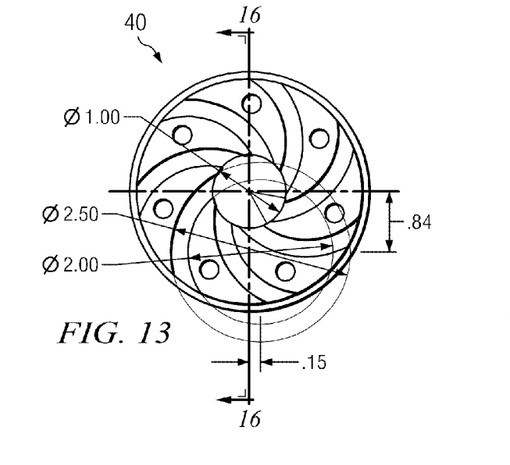
FIG. 13 is a schematic diagram of a rear view of the air diffuser of the CDWE of FIG. 1.
Figure 14:
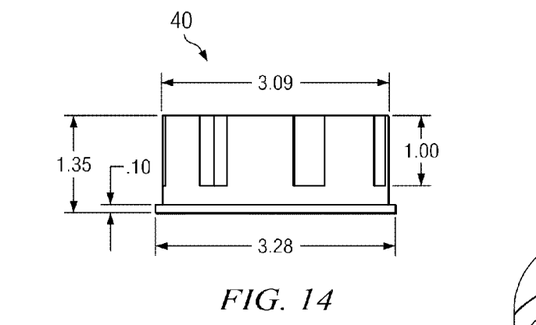
FIG. 14 is a schematic diagram of a side view of the air diffuser of FIG. 13.
Figure 15:
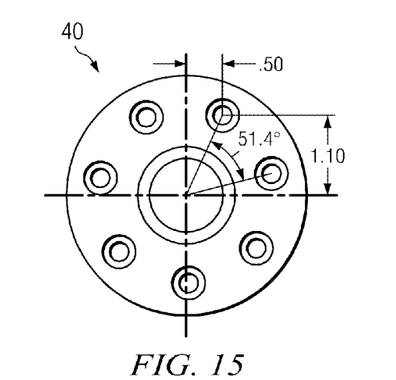
FIG. 15 is a schematic diagram of a front view of the air diffuser of FIG. 13.
Figure 16:
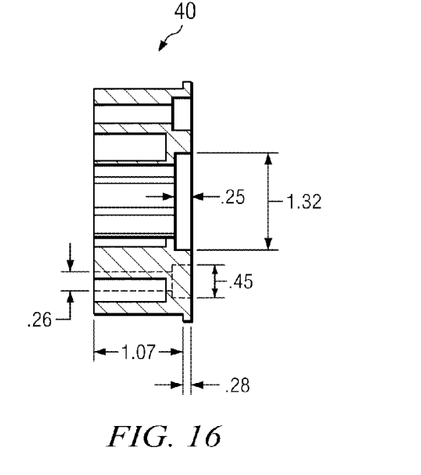
FIG. 16 is a schematic diagram of a cross section of the air diffuser of FIG. 13, along line 16.
Figure 17:
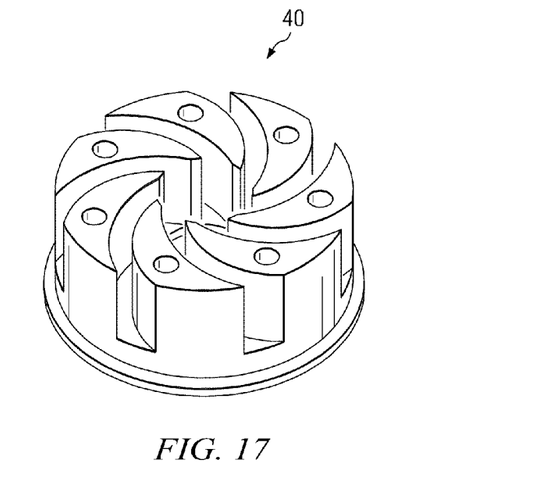
FIG. 17 is a perspective view of the air diffuser of FIG. 13.

FIG. 13 is a schematic diagram of a rear view of air diffuser 40. FIG. 14 is a schematic diagram of a side view of air diffuser 40. FIG. 15 is a schematic diagram of a front view of air diffuser 40. FIG. 16 is a schematic diagram of a cross section of the air diffuser of FIG. 13, along line 16. FIG. 17 is a perspective view of air diffuser 40.

Figure 18:
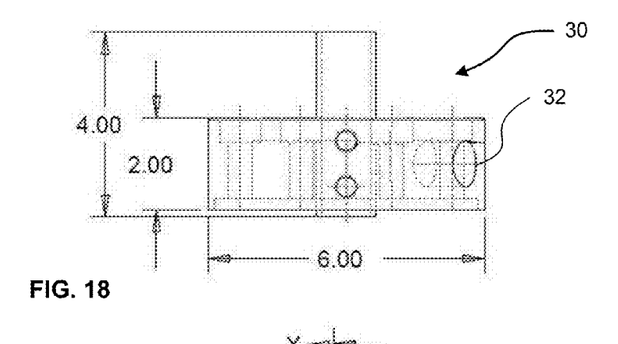
FIG. 18 is a schematic diagram of a side view of the fuel plenum of the CDWE of FIG. 1.
Figure 19:
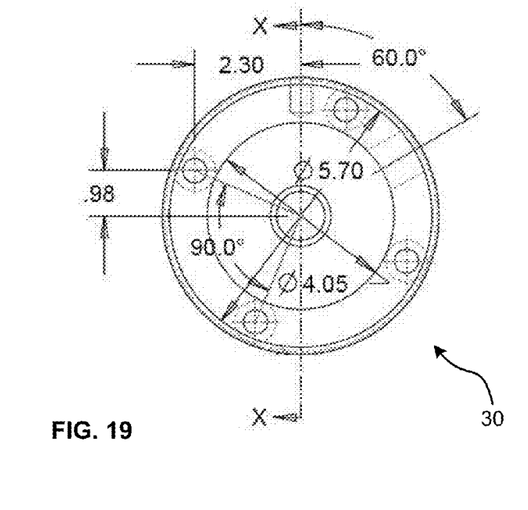
FIG. 19 is a schematic diagram of a rear view of the fuel plenum of FIG. 18.
Figure 20:
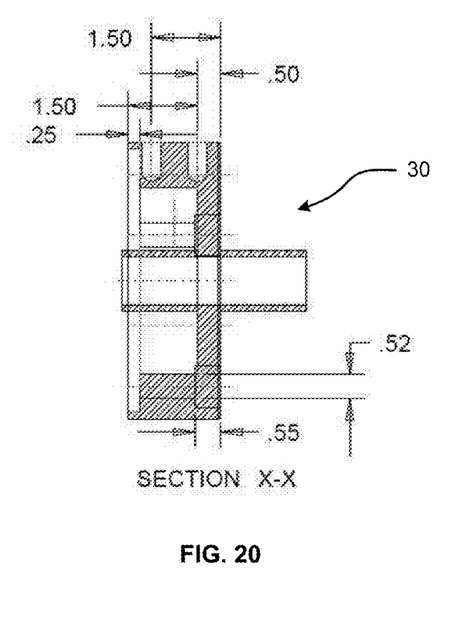
FIG. 20 is a schematic diagram of a cross section of the fuel plenum of FIG. 19, along line X.

FIG. 18 is a schematic diagram of a side view of fuel plenum 30. FIG. 19 is a schematic diagram of a rear view of fuel plenum 30. FIG. 20 is a schematic diagram of a cross section of the fuel plenum of FIG. 19, along line X.

Figure 21:
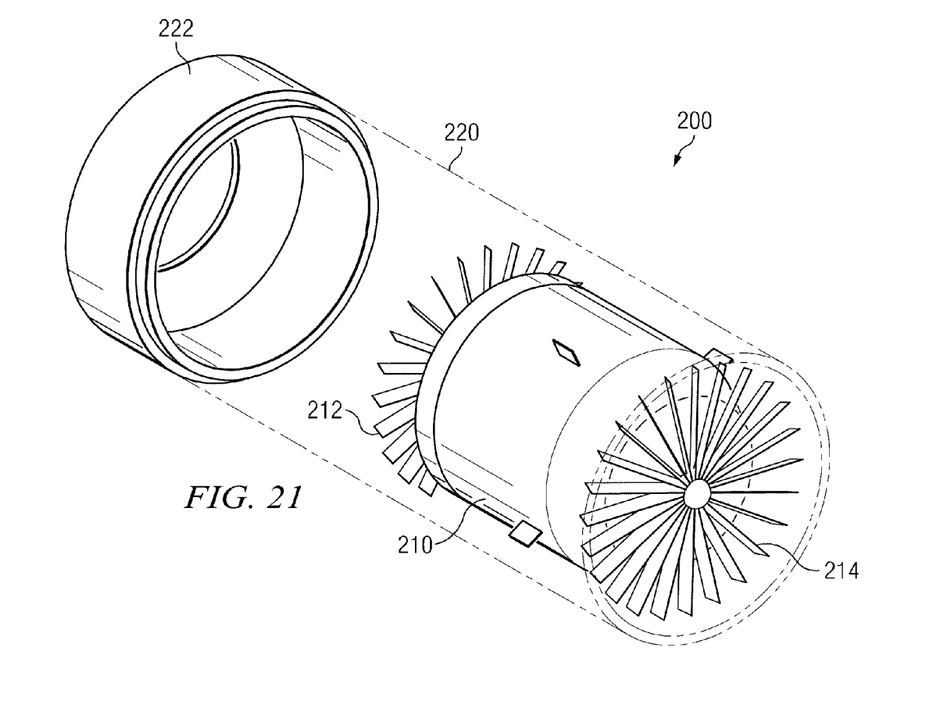
FIG. 21 is a schematic diagram of a perspective view of another CDWE embodiment.

FIG. 21 is a schematic diagram of a perspective view of another CDWE embodiment. In this embodiment, CDWE 200 has a housing 220 and a central combustion unit 210, as well as one or more intake fans or compressors 214 and one or more exhaust fans or turbines 212. The compressor(s) and turbine(s) may be connected, directly or indirectly, by one or more driveshafts. Housing 220 may also include an afterburner and an exhaust nozzle 222. Like CDWE 10, CDWE 200 includes a mixing chamber, a combustion chamber, and an isolator between the mixing chamber and the combustion chamber to prevent detonation from traveling from the combustion chamber to the mixing chamber. Engines like CDWE 200 may be used for vehicle propulsion or for other purposes.

Figure 22:
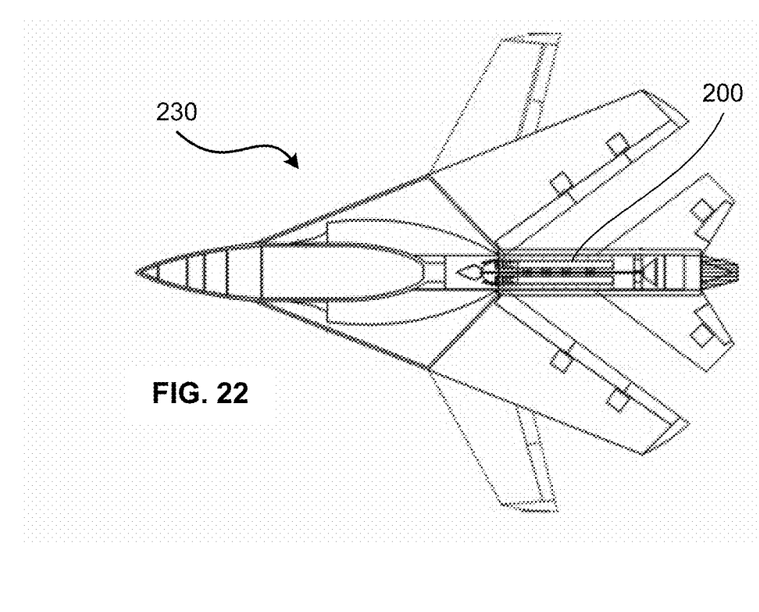
FIG. 22 is a schematic diagram of a top view of an example vehicle that is propelled by a CDWE, according to one embodiment.

FIG. 22 is a schematic diagram of a top view of a vehicle 230 that is propelled by an engine like CDWE 200. In this embodiment, vehicle 230 is an airplane with adjustable wing sweep. However, other types of vehicles may use this type of engine as well, including without limitation other types of planes; helicopters; rockets; hovercraft; terrestrial vehicles such as trains, trucks, buses, cars, etc.; and boats, ships, or other aquatic vehicles.

Figure 23:
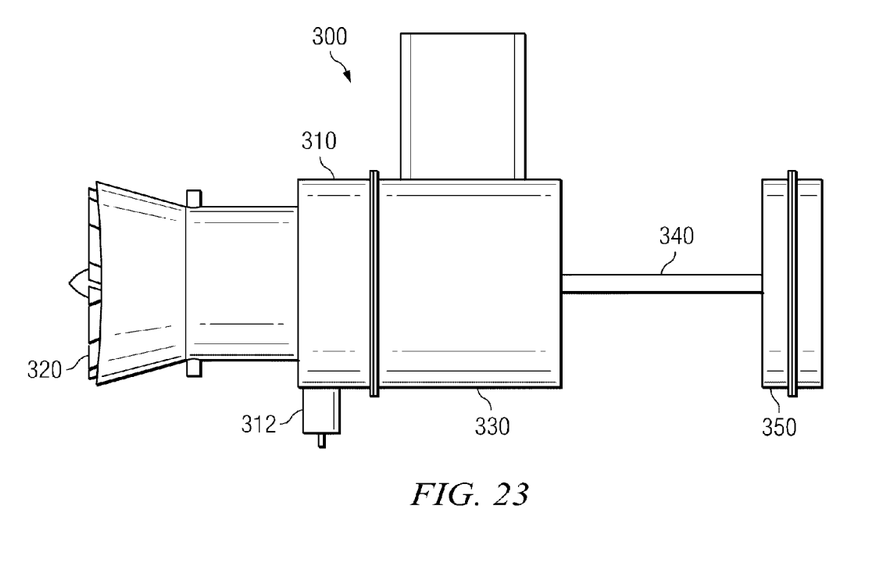
FIG. 23 is a schematic diagram of a side view of a power generating device driven by another embodiment of a CDWE.

FIG. 23 is a schematic diagram of a side view of a power generating device 300 driven by a turboshaft embodiment of a CDWE 310. In this embodiment, CDWE 310 features one or more intake fans or compressors 320 and one or more exhaust fans or turbines. The compressor(s) and turbine(s) may be connected by one or more driveshafts. The turbine may also be coupled, directly or indirectly, to a driveshaft 340 that drives a driven device, such as an electric generator 350, a hydraulic pump, a pulley, or any other suitable device. Also, CDWE 310 features an exhaust chamber 330 with an exhaust port that directs exhaust gases in a direction other than rearward. Like CDWE 10, CDWE 310 includes a mixing chamber, a combustion chamber, and an isolator between the mixing chamber and the combustion chamber to prevent detonation from traveling from the combustion chamber to the mixing chamber. CDWE 310 may also include one or more transducers 312. Engines like CDWE 310 may be used for many purposes, such as for propelling a vehicle, for generating electricity, for moving mechanical devices such as conveyor belts, grain mills, etc.

In alternative embodiments, other kinds of energy conversion devices may be used instead of turbines or in addition to turbines to convert the energy released by detonation into mechanical energy or force (e.g., torque). For instance, like a turbine, the energy conversion device may convert energy from detonation into motion of at least part of the energy conversion device, however that motion need not be radial, and the device need not be shaped like a fan.

As has been described, CDWEs according to the present disclosure may be used as propulsion systems for high-speed aircraft and other vehicles. Moreover, a family of revolutionary new engines may be built, based at least in part on least in part on the teachings provided herein. Such engines may also include features typically found in other types of jet engines, including bypass, afterburning, turboshaft, and various hybrids. Other embodiments may be used for power production, for terrestrial vehicles, or for other purposes. For instance, a hybrid automobile may use a CDWE connected to a flywheel and a battery to enjoy increased efficiency, relative to a hybrid vehicle with only a conventional engine generating power.

In light of the principles and example embodiments described and illustrated herein, it will be recognized that the example embodiments can be modified in arrangement and detail without departing from such principles. Also, the foregoing discussion has focused on particular embodiments, but other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, rearranged, or otherwise altered.

This disclosure also describes various benefits and advantages that may be provided by various embodiments. One, some, all, or different benefits or advantages may be provided by different embodiments.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. An engine, comprising:
   a generally annular combustion chamber dimensioned to allow a fuel mixture to detonate;
   a mixing chamber; and
   a fuel mixture channel that provides for fluid communication between the mixing chamber and the combustion chamber;
   wherein at least part of the fuel mixture channel comprises a quenching structure dimensioned to substantially prevent detonation from spreading from the combustion chamber via the fuel mixture channel to the mixing chamber;
   wherein at least part of the combustion chamber has a height greater than a detonation cell size for a selected fuel mixture;
   wherein at least part of the mixing chamber has a height greater than the detonation cell size for the selected fuel mixture; and
   wherein the quenching structure comprises a generally annular isolator ring.

2. An engine according to claim 1, wherein:
   the fuel mixture channel comprises a generally annular channel between the mixing chamber and the combustion chamber; and
   the quenching structure comprises a generally annular restriction ring in the fuel mixture channel.

3. An engine according to claim 1, further comprising:
   a centerpiece; and
   an outer jacket spaced apart from the centerpiece to form at least part of the generally annular combustion chamber, wherein:
   the mixing chamber is generally annular;
   the fuel mixture channel comprises a generally annular channel between the mixing chamber and the combustion chamber; and
   the quenching structure comprises a generally annular restriction ring in the generally annular channel between the mixing chamber and the combustion chamber.

4. A power production device, comprising:
   an engine according to claim 1, wherein the engine comprises a tail portion that includes at least part of the combustion chamber; and an energy conversion device in the tail portion to convert at least some energy released by detonation into motion of at least part of the energy conversion device.

5. A power production device according to claim 4, wherein the energy conversion device comprises a fan that rotates as a result of detonation in the engine.

6. A power production device according to claim 4, further comprising:
a driveshaft coupled to the energy conversion device.

7. A propulsion device, comprising:
an engine according to claim 1, wherein the engine comprises a tail portion that includes at least part of the combustion chamber; and
a nozzle in the tail portion to produce thrust when the fuel mixture detonates.

8. A method for propelling a vehicle, the method comprising:
supplying fuel to an engine in the vehicle, wherein the engine comprises:
a generally annular combustion chamber dimensioned to allow a fuel mixture to detonate;
a mixing chamber; and
a fuel mixture channel that provides for fluid communication between the mixing chamber and the combustion chamber;
wherein at least part of the fuel mixture channel comprises a quenching structure dimensioned to substantially prevent detonation from spreading from the combustion chamber via the fuel mixture channel to the mixing chamber;
wherein at least part of the combustion chamber has a height greater than a detonation cell size for a selected fuel mixture;
wherein at least part of the mixing chamber has a height greater than the detonation cell size for the selected fuel mixture; and
wherein the quenching structure comprises a generally annular isolator ring;
igniting the fuel mixture to cause a wave of detonation to propagate around the combustion chamber; and
using energy released by detonation of the fuel mixture to propel the vehicle.

9. A method according to claim 8, further comprising:
continuing to supply fuel mixture into the combustion chamber while the wave of detonation is propagating around the combustion chamber, thereby enabling the wave of detonation to continue cycling around the combustion chamber.

10. A method according to claim 8, wherein the engine comprises:
a tail portion that includes at least part of the combustion chamber; and
an energy conversion device in the tail portion to convert at least some energy released by detonation into motion of at least part of the energy conversion device.

11. A method according to claim 10, wherein the energy conversion device comprises a fan that rotates as a result of detonation in the engine.

12. A method according to claim 8, wherein the engine comprises:
a tail portion that includes at least part of the combustion chamber; and
a nozzle in the tail portion to produce thrust when the fuel mixture detonates.

13. A method for producing power, the method comprising:
supplying fuel to an engine in a vehicle, wherein the engine comprises:
a generally annular combustion chamber dimensioned to allow a fuel mixture to detonate;
a mixing chamber; and
a fuel mixture channel that provides for fluid communication between the mixing chamber and the combustion chamber;
wherein at least part of the fuel mixture channel comprises a quenching structure dimensioned to substantially prevent detonation from spreading from the combustion chamber via the fuel mixture channel to the mixing chamber;
wherein at least part of the combustion chamber has a height greater than a detonation cell size for a selected fuel mixture;
wherein at least part of the mixing chamber has a height greater than the detonation cell size for the selected fuel mixture; and
wherein the quenching structure comprises a generally annular isolator ring;
igniting the fuel mixture to cause a wave of detonation to propagate around the combustion chamber; and
using energy released by detonation of the fuel mixture to move an object.

14. A method according to claim 13, wherein:
the object comprises a turbine; and
the method further comprises using the turbine to drive an electric generator.

15. A method according to claim 13, further comprising:
continuing to supply fuel mixture into the combustion chamber while the wave of detonation is propagating around the combustion chamber, thereby enabling the wave of detonation to continue cycling around the combustion chamber.

\* \* \* \* \*